F. G. SIMMONS.
Wheel Hub.
No. 72,233.  Patented Dec. 17, 1867.
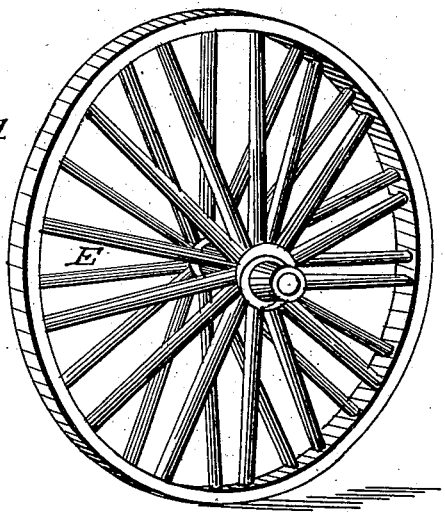
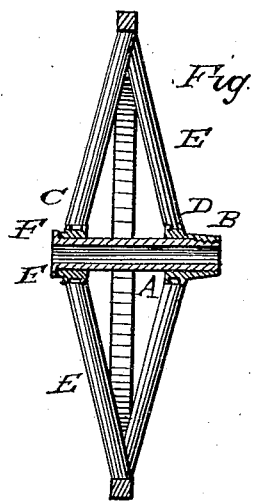
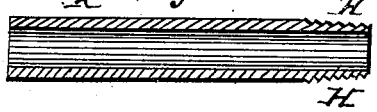
  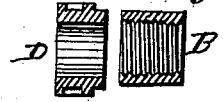
WITNESSES  
Charles J. Kelliane  
John H. Torrance
INVENTOR  
Frederick G. Simmons

United States Patent Office.

FREDERICK G. SIMMONS, OF LANSINGBURG, NEW YORK.

Letters Patent No. 72,233, dated December 17, 1867.

IMPROVED WHEEL FOR WAGONS AND CARRIAGES.

The Schedule referred to in these Letters Patent and making part of the same.

TO ALL WHOM IT MAY CONCERN:

Be it known that I, FREDERICK G. SIMMONS, of the village of Lansingburg, in the county of Rensselaer, and State of New York, have invented a new and improved Wheel for Wagons and other vehicles; and I do hereby declare that the following is a full, clear, and exact description of the same, reference being had to the accompanying drawings, which form and make a part of this specification.

Like letters represent and refer to like or corresponding parts.

Figure 1 is a perspective view of a wheel constructed in accordance with and containing my said invention and improvements, as hereinafter fully described and set forth.

Figure 2 is a cross-section of my said improved wheel, showing the hub A, and the cap or nut B thereon, substantially as hereinafter described and set forth.

Figure 3 is a view of the metallic hub A of my said improved wheel, with the socket-cylinders C and D removed therefrom in the manner and for the purposes hereinafter described and set forth.

Figures 4 and 5 are cross-sections of the socket-cylinders C and D, which are fastened on the said hub A, and into which the spokes E are set, as hereinafter described and set forth.

Figure 6 is a view of the nut or cap B, which screws on to the hub A, and firmly binds and holds the various parts of the wheel together, substantially in the manner and by the means hereinafter described and set forth.

The nature of my said invention and improvements consists in the employment of two socket-cylinders, C and D, disconnected from the hub of the wheel, and into which the spokes are set, in the manner and for the purposes hereinafter fully described and set forth.

It also consists in the employment of the cap or nut B, or its equivalent, which screws on to one end of the hub A, and by means of which the spokes are firmly held in their position, or may be readily taken out when desired, substantially as hereinafter described and set forth.

To enable others skilled in the art to which my invention relates to make and use the same, I will here proceed to describe the construction and operation of the same, which is as follows, to wit:

The hub A is made of iron, or any other material deemed best, and of any length desired. Upon and around the said hub A, I place the socket-cylinders C and D. The cylinder C is placed at one end of the hub A, and is prevented from slipping off that end by the flange F, which is cast upon the said hub A, or, if deemed best, the said socket-cylinder C may be cast with and form a part of the said hub A. The other socket-cylinder, D, is designed to work freely upon the said hub A. Into these socket-cylinders C and D are alternately placed the spokes E, and, at their other ends, enter into suitably-prepared sockets in the felloe of the wheel. Upon one end of the hub A is cut the thread H, on to which the cap or nut B is screwed. After the spokes E have all been placed in their proper sockets in the felloe and in the cylinders C and D, and it is desired to fasten and securely connect the various parts of said wheel together, the nut or cap B is screwed upon the hub A, and, pressing against the socket-cylinder D, it slides the same along the hub A until all the spokes E are firmly and securely set. The socket-cylinder C is prevented from moving or slipping off the hub A by the flange F, fig. 2.

If at any time it is desired to remove one of the spokes E to replace it by a new one, or for repairs, the nut or cap B is removed from the hub A, and in this condition the spokes may be readily removed, and it is but a moment's work to again set the said spokes, and put the wheel in running order, as hereinbefore described.

The hub A and socket-cylinders C and D may be made of any material, and of any size and strength required, but I generally prefer to make them of cast or wrought iron, as being the most durable and the best adapted to the required purpose. By this means I am enabled to construct a wheel which combines lightness and strength to a degree heretofore not obtained, and, as the spokes radiate from two different points upon the said hub A, it allows more to be used than heretofore. The distance between the said socket-cylinders C and D may, of course, be regulated by the manufacturer according to the character of the wheel desired to make, and the strength which it is desired to give. The employment of the nut or cap B also enables a man to repair, to a certain extent, his own vehicle, without the trouble and expense of sending it to a wheelwright, as the same may be readily taken apart and put together, as hereinbefore fully described and set forth.

Having thus described the nature of my said invention and improvements, what I claim as my invention, and desire to secure by Letters Patent, is—

1. The employment of the socket-cylinders C and D, one cast on the hub A, the other disconnected therefrom and working freely thereon, and in combination with the said hub A, substantially as herein described and set forth.

2. I also claim, in a wagon-hub, the socket-cylinders C and D, the hub A, and nut or cap B, constructed and arranged in the manner and for the purposes substantially as herein fully described and set forth.

In testimony whereof, I have hereunto set my hand, this 9th day of April, 1867.

FREDERICK G. SIMMONS.

Witnesses:
CHARLES D. KELLUM,
JOHN H. TORRANCE.